April 18, 1961     C. VAN DER LELY     2,980,431

SPREADING DEVICES

Filed March 1, 1957

INVENTOR.
CORNELIS VAN DER LELY

United States Patent Office 2,980,431
Patented Apr. 18, 1961

2,980,431
SPREADING DEVICES

Cornelis van der Lely, Maasland, Netherlands
(7 Bruschrain, Zug, Switzerland)

Filed Mar. 1, 1957, Ser. No. 643,269

Claims priority, application Netherlands Mar. 9, 1956

4 Claims. (Cl. 275—8)

This invention relates to devices for spreading granular or pulverulent material.

Spreading devices are generally known but have the disadvantage that they tend to spread material unevenly on the ground.

According to the invention there is provided a device for spreading granular or pulverulent material, characterized in that it is provided with a spreading member for the material, which spreading member extends in the direction of the width of the device and which is mounted for rotation about a substantially horizontal axis, the spreading member being provided with a helically disposed flight, and cooperating, at least over part of its length, with a guide member, the material obtaining, during operation of the device a velocity component in the direction of the width of the device, owing to the rotation of the spreading member and the helical disposition of the flight, such that the material is spread over a distance greater than the width of the device.

It is advantageous to provide a screen on the lower side of the spreading member, and the screen may, at the same time, constitute the guide member. Apart from a satisfactory spreading of the material, this minimizes sorting of the spreading member. It is preferable to insure that the guide member engages part of the curved surface of a cylinder which surface is generated by the flight whereby the material is efficiently brought into contact with the spreading member, so that the flight can impart a high lateral velocity to the material. The flight of the spreading member may be one helical member or may be a plurality of blades which are arranged along a substantially helical line.

It is preferable that the width over which the guide member extends along the said curved surface varies in the longitudinal direction of the spreading member, so that the distribution of the material can be varied in the direction of the width of the device. This variation of width is achieved by making the ends of the guide member engage the curved surface over a larger part of the periphery than the center of the guide member. Thus, near the ends of the spreading member, the material is in contact with the flight for a longer time, so that the material at the ends acquires a higher lateral velocity than the material in the center.

Figure 1:
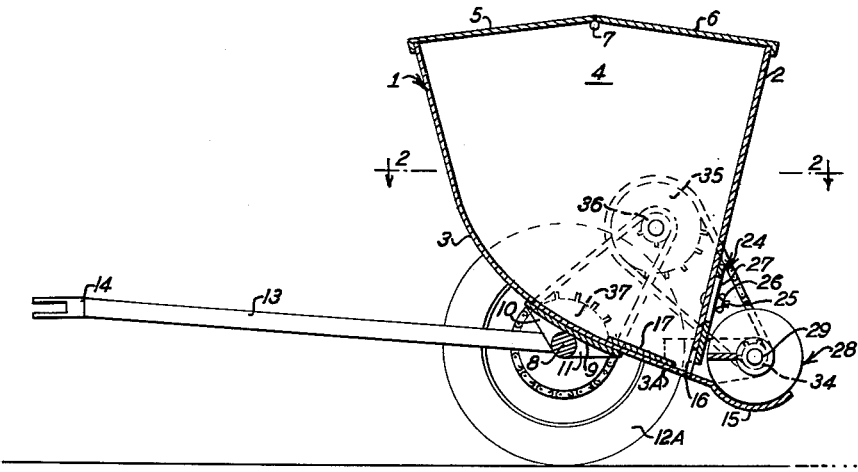
Figure 2:
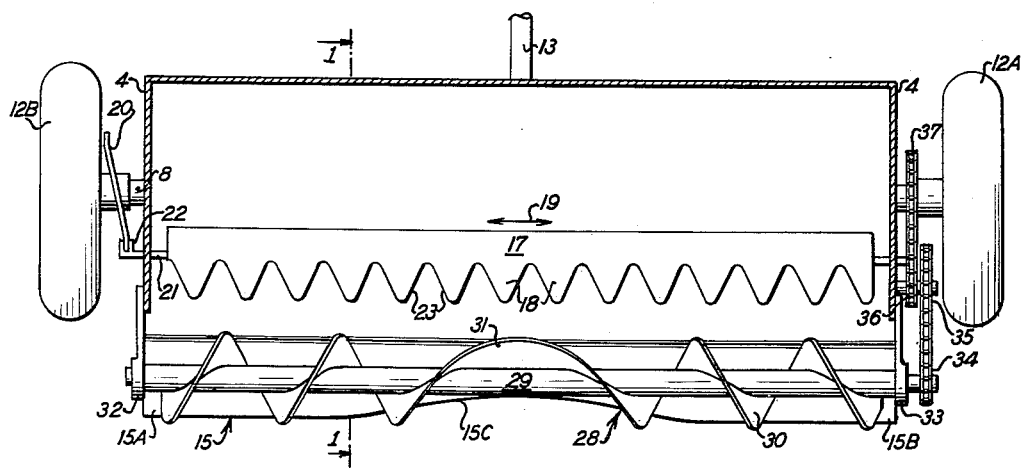
Figure 3:
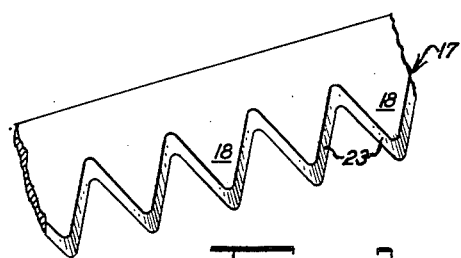

For a better understanding of the invention and to show how the same may be carried into effect reference will now be made to the accompanying drawings in which:

Fig. 1 is a sectional side elevation of a spreading device provided in accordance with the invention, Fig. 2 is a sectional view taken on line I—I of Fig. 1, part of the device being omitted, and Fig. 3 is an enlarged view of part of a comb employed in the apparatus.

Referring now to the drawings, there is shown a spreading device comprising a container 1 having a rear wall 2 and a front wall 3, which are connected to one another by two side walls 4. The top of the container is constituted by covers 5 and 6, which are adapted to pivot about a shaft 7, and the bottom of the container is constituted by an extension 3A of the wall 3. The container 1 is supported on a shaft 8, to which it is secured by means of a plate 9, which is reinforced by flanges 10 and 11.

Ground wheels 12A and 12B are mounted one at each end of the shaft 8 so that the device can move over the ground. A draw bar 13 is secured to the shaft 8, the draw bar having a fork 14 at its free end, so that the device can be attached to a tractor or like vehicle.

The bottom 3A is extended beyond the container to form a guide plate 15, to which the material to be distributed can be supplied from the container 1 through a slot 16 formed between the rear wall 2 and the bottom 3A. A comb 17 (Fig. 3), which is formed with teeth 18, is disposed at the bottom of the container, and is adapted to push the material out of the container through the slot 16 when the comb 17 is oscillated in the direction of the arrow 19, the teeth 18 having slanting sides 23 which serve to push the material in the direction of the guide plate 15.

In order to obtain oscillation of the comb 17, a cam disc 20 is obliquely mounted on the hub of the wheel 12B, the cam disc 20 having a marginal rim portion which is radially disposed relative to the axis of rotation of the wheel, and which engages in a fork 22 mounted on one end of a rod 21, the other end of which is connected to the comb 17. The cam disc 20 may be uncoupled from the wheel 12B, so that the comb 17 may, if desired, be rendered inoperative. A slide 24 is provided above the slot 16, and is secured to the wall 2 by means of bolts 25 and wing nuts 26, which bolts 25 pass through slots 27 formed in the slide 24, the arrangement of the slots being such that the height of the slide 24 can be varied to control the supply of the material to the guide plate 15 by opening or closing the slot 16.

A spreading member 28 is disposed over the guide plate 15 and is arranged to rotate rapidly during operation, i.e., with a speed of more than 400 revolutions a minute.

The guide plate 15 is curved in the form of part of the curved surface of a cylinder, the axis of which coincides with the axis of rotation of the spreading member 28, and the ends 15A and 15B of the guide plate each constitute a larger part of the surface of the cylinder than the center 15C.

The spreading member 28 comprises a shaft 29, about which is arranged a helical flight 30, the pitch of which varies in the longitudinal direction of the shaft 29. The pitch is a minimum near the ends of the shaft. At one end of the shaft 29, the flight 30 has a left-hand thread and at the other end of the shaft it has a right-hand thread, the transition from the left-hand to the right-hand thread occurring smoothly in the central part 31 of the flight. The shaft 29 is journalled in two bearings 32 and 33, secured to the side walls 4, and a sprocket wheel 34 is rigidly mounted at one end of the shaft 29, the sprocket wheel 34 being connected by means of a chain to a sprocket wheel 35. The sprocket wheel 35 is rigidly connected to a sprocket wheel 36, which itself, is connected by means of a chain with a sprocket wheel 37, which is connected via a clutch (not shown) to the wheel 12A. When, during the movement, the wheel 37 is coupled to the wheel 12A through the agency of the clutch, the wheel 12A will drive the spreading member 28 via the sprocket wheels 37, 36 and 35, but, by uncoupling the clutch, the device may be moved without rotating the spreading member.

In the operation of the device when the sprocket wheel 37 is coupled to the wheel 12B, the spreading member will, during movement of the device, rotate at a high speed. Thus the flight 30 will catch the material supplied to the guide plate 15, the material remaining in contact with the flight over that width of the guide plate which surrounds the spreading member. The shape of the flight determines the direction in which the material is spread. For a spreading device with a large range of applications it has been found to be advantageous that the pitch of the flight varies in the longitudinal direction of the spreading member, the pitch being a minimum at the ends of the spreading member, and the ends of the guide plate engaging the spreading member over a larger width than the centre of the guide member.

A uniform distribution of the material is obtained in this manner and it is spread over a width exceeding the width of the device, by virtue of the fact that the helical flight 30 imparts to the material a velocity component transverse to the direction of travel of the device.

In certain cases, it may be important to vary the width over which the guide plate engages the spreading member in a different manner from that described above. It has been found desirable that the bottom of the spreading member 28 should lie at a height of less than about nineteen inches above the ground, so that, under normal circurstances, a satisfactory distribution is obtained without being appreciably affected by the wind.

What I claim is:

1. A device for spreading material comprising a hopper having a discharge opening, a guide member adjacent the opening for receiving the material and extending over the width of the hopper, a rotatable spreading member adjacent the guide member and extending over the width of the hopper, said spreading member including a blade-like helical flight, the flight having a pitch which decreases towards each extremity of the spreading member from the center therof, and means for rotating the spreading member at a speed to distribute the material over a width substantially greater than the width of the hopper.

2. A device as claimed in claim 1 wherein the outermost extremities of the flight describe the curved surface of a cylinder when the spreading member rotates and wherein the guide member has a curved surface concentric with the curved surface described by the flight, the guide member having a maximum width at its end and a minimum width at its center.

3. A device as claimed in claim 2 wherein the flight has a left-hand thread and a right-hand thread at the other end to spread the material away from the center of the device.

4. A device as claimed in claim 3 wherein the flight comprises a turn of reversed pitch to effect a transition of the flight from left-hand to right-hand thread.

References Cited in the file of this patent

UNITED STATES PATENTS

| 780,708 | Collins | Jan. 24, 1905 |
| 2,079,061 | Zuckerman | May 4, 1937 |
| 2,368,470 | Hopkins | Jan. 30, 1945 |

FOREIGN PATENTS

| 154,287 | Australia | Nov. 23, 1953 |
| 349,659 | France | Dec. 29, 1904 |
| 1,034,462 | France | Apr. 8, 1953 |
| 131,634 | Germany | June 4, 1902 |
| 367,919 | Germany | Jan. 30, 1923 |
| 437,988 | Germany | Dec. 2, 1926 |
| 438,094 | Germany | Dec. 7, 1926 |